United States Patent [19]

Betts et al.

[11] 4,036,690

[45] July 19, 1977

[54] NUCLEAR REACTOR FUEL ELEMENT ASSEMBLIES

[75] Inventors: Colin Betts, Hale Altrincham; Alfred Edward Collinson, Padgate Warrington; David Frederick Hart, Stretton Warrington, all of England

[73] Assignee: United Kingdom Atomic Energy Authority, London, England

[21] Appl. No.: 638,669

[22] Filed: Dec. 8, 1975

[30] Foreign Application Priority Data

Dec. 31, 1974 United Kingdom ............... 56230/74

[51] Int. Cl.² .............................................. G21C 15/04
[52] U.S. Cl. ....................................... 176/40; 176/61; 176/64; 176/76; 176/78
[58] Field of Search ................... 176/40, 60, 61, 64, 176/65, 76, 78, 87

[56] References Cited

U.S. PATENT DOCUMENTS

| | | | |
|---|---|---|---|
| 3,296,085 | 1/1967 | Peck et al. .......................... | 176/40 X |
| 3,664,923 | 5/1972 | Connolly .............................. | 176/40 |
| 3,763,886 | 10/1973 | Lambert ............................ | 176/61 X |
| 3,873,419 | 3/1975 | Sletton ............................... | 176/40 X |
| 3,892,625 | 7/1975 | Patterson ........................... | 176/61 X |

OTHER PUBLICATIONS

*Clinch River Breeder Reactor Project*, U.S.A.E.C., Tech. Inf. Center, P.O. Box 62, Oak Ridge, Tenn. 37830, p. 89, Jan. 1974.

*Primary Examiner*—Peter A. Nelson
*Attorney, Agent, or Firm*—Larson, Taylor and Hinds

[57] ABSTRACT

A nuclear reactor fuel element assembly comprising a bundle of fuel elements in a tubular wrapper for conducting liquid metal coolant flow has a cavitation suppressing impedance. The impedance comprises a tubular member housing a series of flow defining plates the plates comprising two sets arranged so that plates of each set are positioned alternately along the tubular member, the plates of one set being of woven wire mesh and those of the other set being thick apertured plates.

3 Claims, 4 Drawing Figures

NUCLEAR REACTOR FUEL ELEMENT ASSEMBLIES

BACKGROUND OF THE INVENTION

This invention relates to nuclear reactor fuel element assemblies and to axial flow cavitation suppressing impedances therefor. The invention is concerned with the problem of cavitation arising from impedances inserted in coolant flow channels in order to regulate the pressure drop in the channels and with flow induced fatique problems. Cavitation is particularly objectionable in fluid flow channels of a nuclear reactor because it creates 'noise', erosion and vibration of components. It is known to put impedances in the coolant flow channels of a nuclear reactor core to regulate the flow of coolant through fuel elements and thereby control the operating temperatures of the fuel. Early forms of impedance were of the orifice plate type but these gave rise to severe cavitation with large coolant flows and large pressure drops across the orifice. An improved impedance for fluid flow is disclosed in U.S. Pat No. 3,678,963 the impedance comprising a tubular body member housing a series of flow-defining plates arranged transverse to the longitudinal axis of the body member, the series being formed from a first and a second set of plates arranged so that a plate of one set alternates, as viewed in the direction of flow, with a plate of the other set, the first set of plates being of woven wire mesh form and there being a downstream space between plates of the first set to define a flow which is cavitation suppressed by virtue of eddy-induced pressure drops developed in the downstream spaces and the second set of plates being apertured to define the presented flow area of the impedance. An impedance of the improved kind will be referred to hereinafter as an axial flow cavitation suppressing impedance of the described kind. It is an object of the present invention to provide a nuclear reactor fuel element assembly incorporating an axial flow cavitation suppressing impedance generally of the described kind but which offers more resistance to vibration.

SUMMARY OF THE INVENTION

According to the present invention in a nuclear reactor fuel element assembly having an axial flow cavitation suppressing impedance of the described kind the series of flow defining plates are clamped into face-to-face abutment and the downstream spaces existing between plates of the first set are defined by aligned cylindrical apertures in the plates of the second set.

The invention finds application in a liquid metal cooled fast breeder reactor, the fuel element assembly comprising, in addition to an axial flow cavitation suppressing impedance of the described kind, a bundle of spaced fuel elements housed within a tubular wrapper, the wrapper forming an extension of the body member at one end and there being spike means disposed at the other end of the body member for locating the fuel assembly in a nuclear reactor core. The fuel element assemblies are disposed side-by-dide on a diagrid and the coolant is flowed upwardly through the wrappers in heat exchange with the fuel elements. The impedances are variable and are required to provide optimum flow of coolant throughout the reactor core. The impedances according to the present invention minimise cavitation in the coolant flow and are sufficiently robust to withstand vibration forces generated by the restricted flow of coolant.

DESCRIPTION OF THE DRAWINGS

A constructional embodiment of the present invention is described by way of example with reference to the accompanying drawings wherein.

DESCRIPTION OF THE PREFERRED EMBODIMENTS

Figure 1:
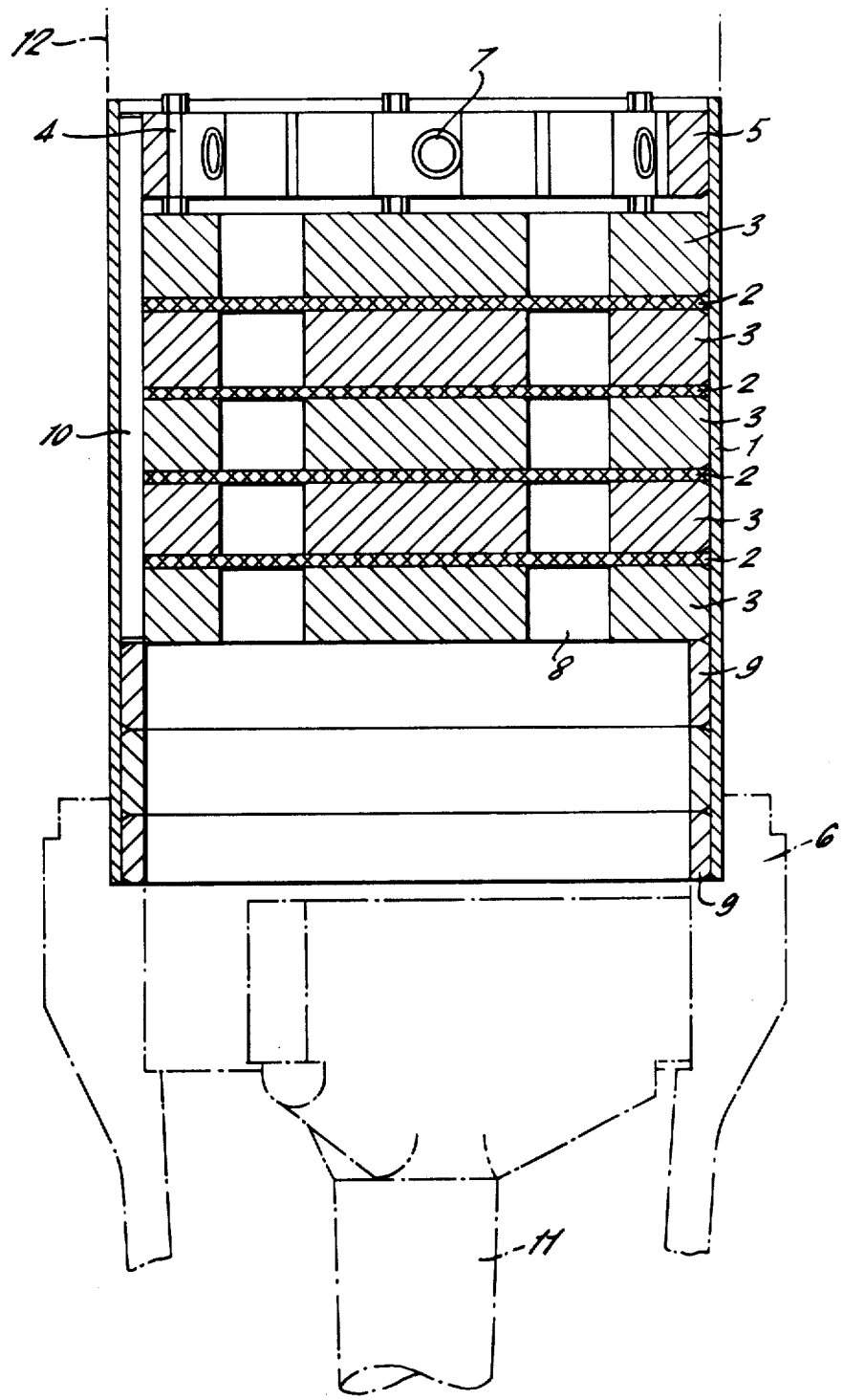
FIG. 1 is a fragmentary sectional view of an axial flow cavitation suppressing impedance for a nuclear reactor fuel element assembly.
Figure 2:
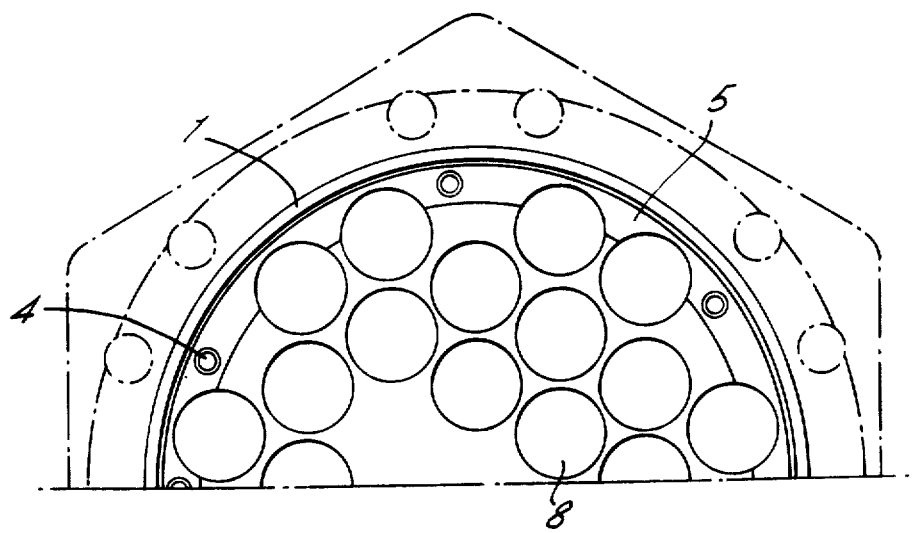
FIG. 2 is a half plan view.

The axial flow cavitation suppressing impedance shown in the drawings comprises a tubular body member 1 housing a series of flow-defining plates 2 and 3 transverse to the longitudinal axis of the body member. The series of plates is formed from a first set of plates 2 and a second set of plates 3 arranged so that a plate 2 alternates, as viewed in the direction of flow, with a plate 3, each end plate of the series being a plate 3. The series of plates are clamped into face-to-face abutment by means of jacking screws 4 reacting through a retaining ring 5 and a structure 6 to which the body member 1 is secured. The retaining ring 5 is secured to the body member 1 by means of dowels 7. The plates 2 are of woven wire mesh and the plates 3 have cylindrical apertures 8 which define downstream spaces between the plates. The number of apertures in the plates 3 and the number of plates 2 and 3 may be varied on assembly to obtain a pre-selected pressure drop through the impedance. Positions in the body which are unoccupied by plates 2, 3 are occupied by spacer rings 9. On assembly all the plates 2 and 3 are located at the downstream end of the body and the plates 3 are orientated by a wire key 10 so that corresponding apertures in adjoining plates are held in alignment to provide continuous flow passages.

Figure 3:
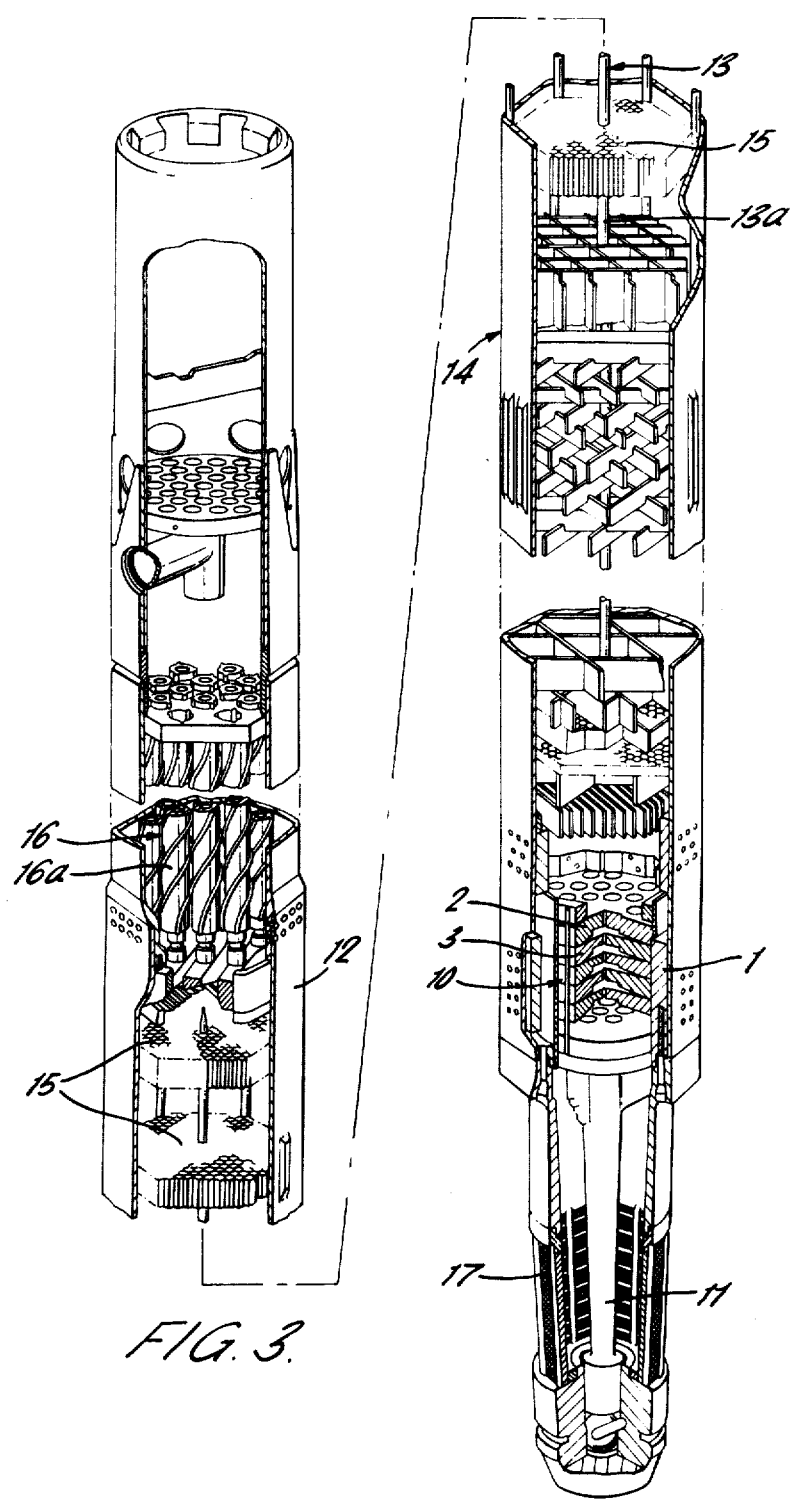
FIG. 3 is a fragmentary view of a fuel element assembly for a liquid metal cooled fast breeder reactor.

The cavitation suppressing impedance shown in the drawings is used as a component designated 10 of a fuel element assembly 14 (shown in FIG. 3) for a liquid metal cooled fast reactor. The fuel element assembly 14 comprises a bundle 13 of spaced fuel elements (only one element designated 13a being shown) housed within a tubular wrapper 13 of hexagonal cross-section. The wrapper 12 forms an extension of the body member 1 at one end and there is spike means 11 disposed at the other end of the body member for locating the fuel element assembly in a nuclear reactor core. The fuel elements 13a are spaced apart by a series of spaced cellular grids 15 and the bundle is surmounted by a bundle 16 of breeder elements 16a. The spike means 11 is surrounded by a filter element 17.

Figure 4:
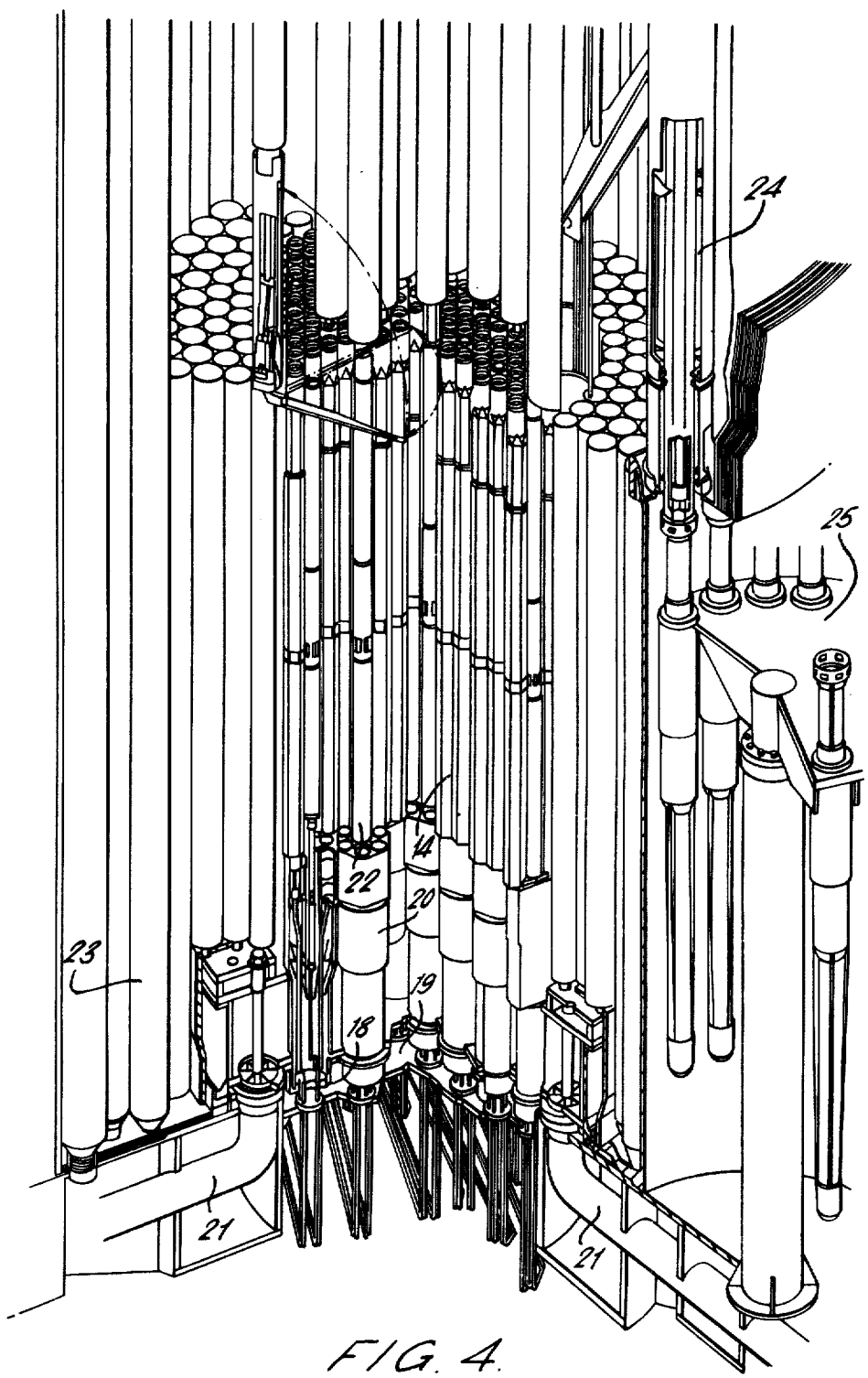
FIG. 4 is a fragmentary sectional view of a liquid metal cooled fast breeder nuclear reactor.

In FIG. 4 there is shown a liquid metal cooled nuclear reactor core. The core comprises a plurality of upstanding fuel element assemblies 14 closely arranged side-by-side and secured at their lower ends to a support member 18. The support member 18 comprises a diagrid 19 and a plurality of fuel assembly carriers 20 each of which is adapted to carry a group of fuel element assemblies. The diagrid 19 also serves as a distributor for coolant flow to the fuel element assemblies the coolant being delivered to the diagrid 19 by way of pipes 21. At the centre of each group of fuel element assemblies 14 there is a control rod guide tube 28 and the entire assembly of fuel assemblies and control rod guide tubes is surrounded by a plurality of neutron shield rods 23. The entire assembly of fuel assemblies 14, control rod guide tubes 22 and neutron shield rods 23 is engirdled in the upper region of the core by a fixed ring girder which is not shown in FIG. 4. A fuel charge chute and fuel storage rotor are shown at 24 and 25. On assembly of the core the fuel element assemblies are free standing with small clearances between neighbouring assemblies. Liquid sodium coolant is flowed upwardly from the diagrid through the filter elemens 17 the cavitation suppressing impedance 10 and the tubular wrapper 12 in heat exchange with the fuel elements. Each fuel element assembly of the nuclear reactor has a cavitation suppressing flow impedance and the impedances are varied in order to achieve optimum rates of flow throughout the reactor core. Because the presented flow area of the impedance is divided into multiple discrete small areas the wire mesh is well supported and subject to little vibration, consequently reducing the severity of the flow fatigue problem.

We claim:

1. A nuclear reactor fuel element assembly having an axial flow cavitation suppressing impedance comprising a tubular body member and a series of flow defining plates arranged transversely to the longitudinal axis of the body member and clamped into face-to-face abutment, the series being formed from a first and a second set of plates arranged so that a plate of one set alternates, as viewed in the direction of flow, with a plate of the other set, the plates of the first set being of woven wire mesh and the plates of the second set having cylindrical apertures to provide downstream spaces between plates of the first set for defining a flow which is cavitation suppressed by virtue of eddy induced pressure drops developed in the downstream spaces, corresponding apertures in successive plates being aligned to provide continuous flow paths through the series of plates.

2. A nuclear reactor fuel element assembly according to claim 1 and comprising a bundle of spaced fuel elements housed within a tubular wrapper, the wrapper forming an extension of the body member at one end and spike means disposed at the other end of the body member for locating the fuel element assembly in a nuclear reactor core.

3. A liquid metal cooled fast breeder nuclear reactor comprising a plurality of fuel element assemblies according to claim 2 disposed side-by-side on a diagrid and arranged for upward flow of coolant through the wrappers in heat exchange with the fuel elements.

* * * * *